H. C. BUHOUP.
CAR TRUCK.
APPLICATION FILED JAN. 10, 1911.
994,635.
Patented June 6, 1911.
3 SHEETS—SHEET 3.
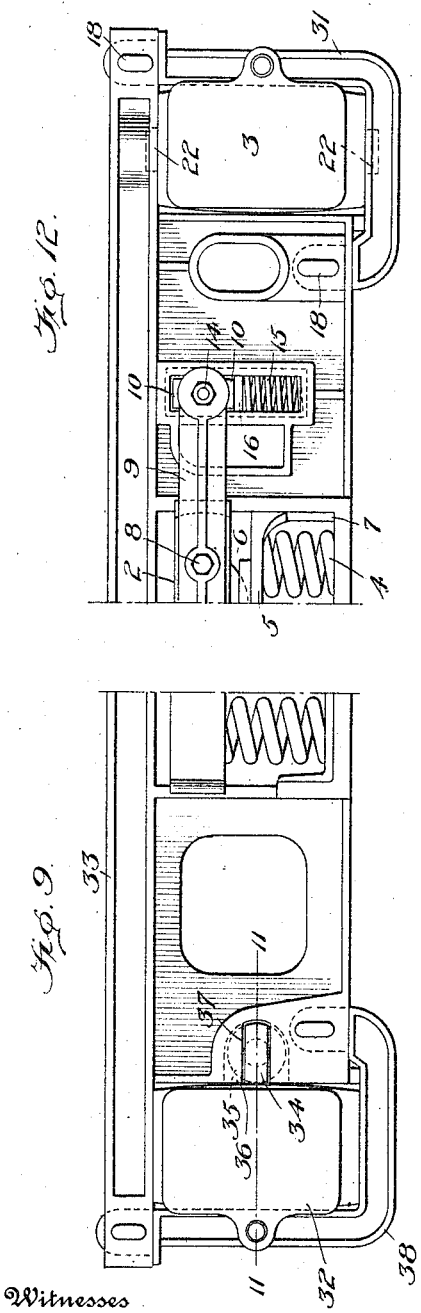
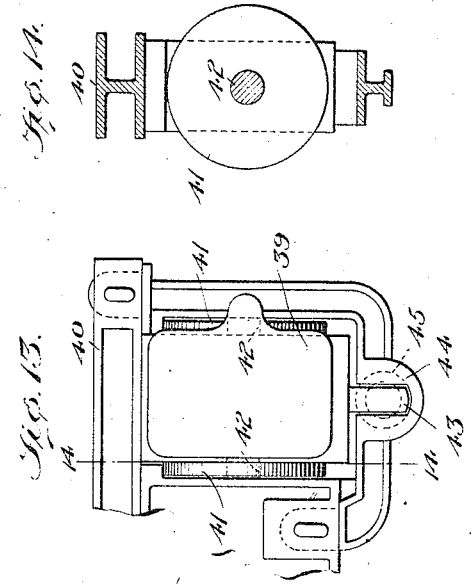
Witnesses
Edwin L Bradford
Wm C Wyre
Inventor
Harry C. Buhoup
By Ritter & Ritter
His Attorneys

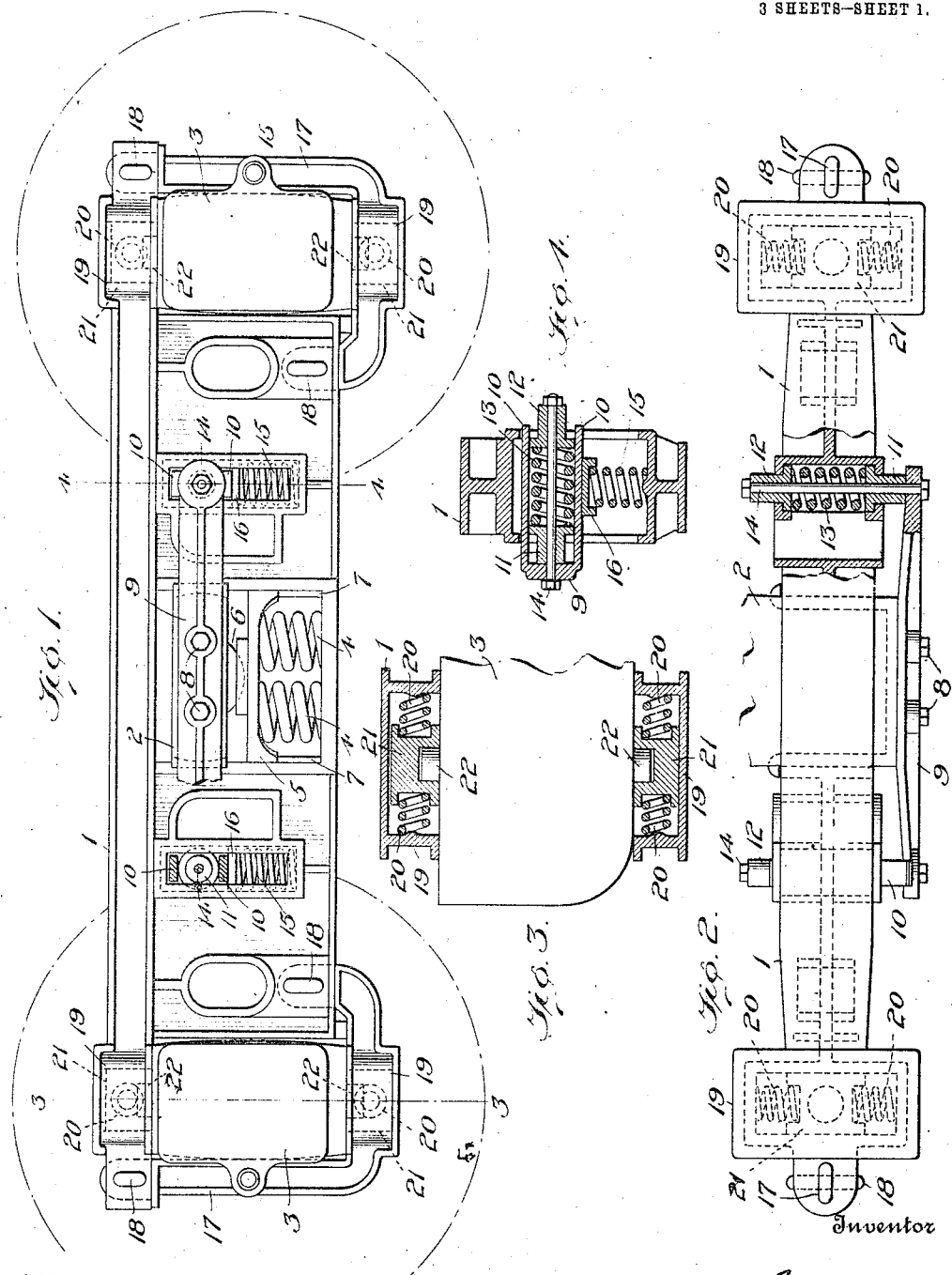

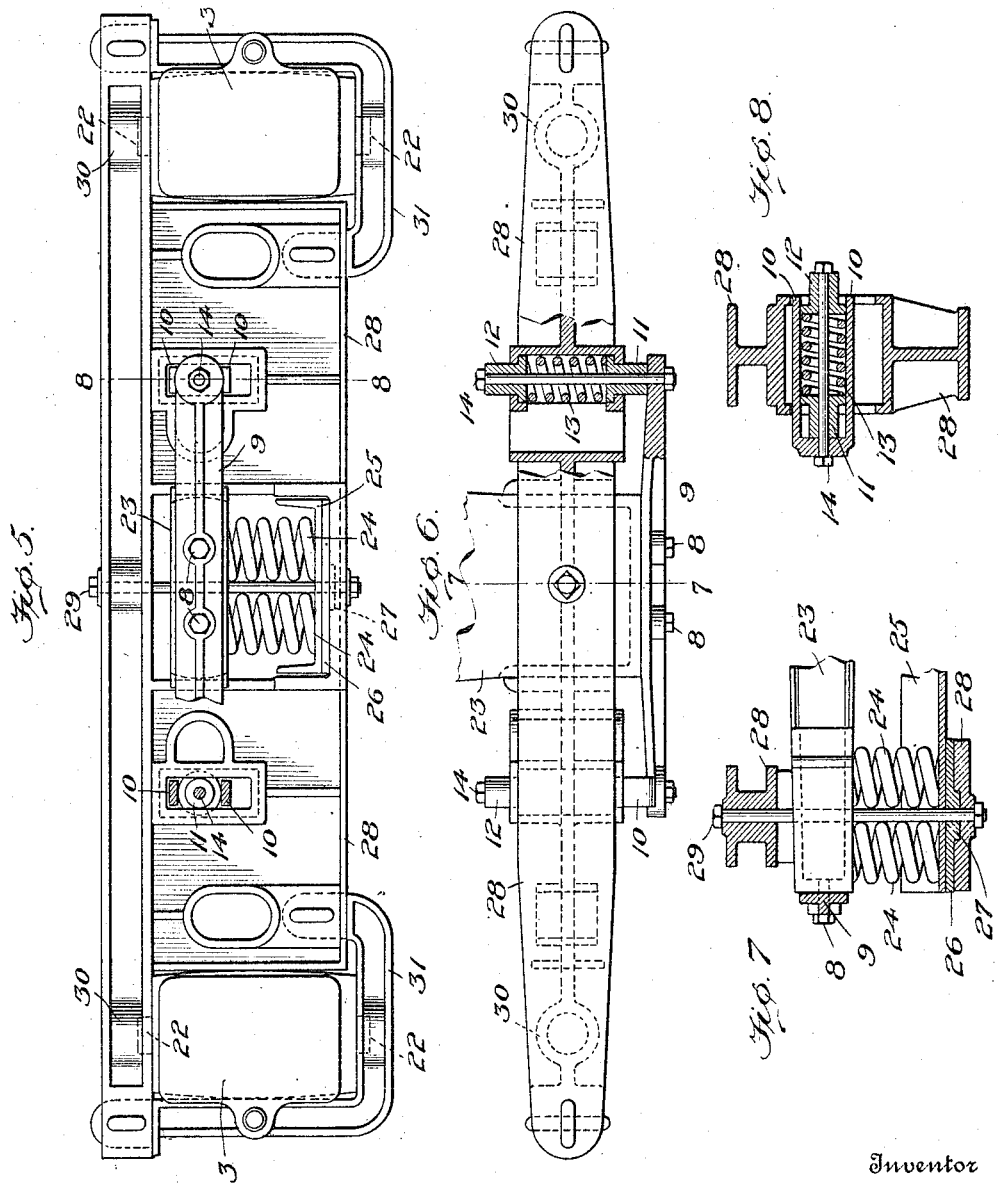

UNITED STATES PATENT OFFICE.

HARRY C. BUHOUP, OF CHICAGO, ILLINOIS.

CAR-TRUCK.

994,635.

Specification of Letters Patent.  Patented June 6, 1911.

Application filed January 10, 1911.   Serial No. 601,883.

*To all whom it may concern:*

Be it known that I, HARRY C. BUHOUP, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My invention relates to the construction of trucks for railway vehicles, and has for its principal object the production of a truck in which the parts are yieldingly connected, whereby the flange wear of the truck wheels is greatly reduced.

The principal feature of my invention, generally stated, consists in so combining the side frames of a car truck with the bolster that the latter may have a pivotal or rotary movement horizontally with respect to the side frames.

A further feature of my invention consists in so combining the journal boxes with the side frames that the former are adapted to have horizontal movement with respect to the side frames.

There are other features of invention residing in particular combinations and elemental constructions, all as will hereinafter more fully appear.

In the drawings chosen for the purpose of illustrating my invention, the scope whereof is pointed out in the claims, Figure 1 is a view partly in side elevation and partly in vertical section, of a car truck embodying my invention; Fig. 2 is a view, partly in plan and partly in horizontal section, of one side of the car truck shown in Fig. 1; Fig. 3 is a view taken in the plane of the line 3—3, Fig. 1, the journal box being shown in elevation; Fig. 4 is a sectional view taken in the plane of the line 4—4, Fig. 1; Fig. 5 is a side elevation of a modified form of car truck embodying my invention; Fig. 6 is a view, partly in plan and partly in horizontal section, of one side of the car truck illustrated in Fig. 5; Fig. 7 is a vertical central section taken in the plane of the line 7—7 Fig. 6, the bolster being shown in elevation; Fig. 8 is a vertical section taken in the plane of the line 8—8, Fig. 5; Fig. 9 is a side elevation of one-half of a car truck embodying a modified form of connection between the side frames and journal boxes; Fig. 10 is a detail view showing in side elevation one end of the side frame illustrated in Fig. 9; Fig. 11 is a detail section taken in the plane of the line 11—11, Fig. 9; Fig. 12 is a side elevation of one-half of a truck frame embodying a further modified form of means for movably connecting the journal boxes to the side frames; Fig. 13 is a detail side elevation of one end of a truck embodying my invention showing a further modified means of connecting the journal boxes to the side frame, and Fig. 14 is a vertical section taken in the plane of the line 14—14, Fig. 13.

Like symbols refer to like parts wherever they occur.

I will now proceed to describe my invention more fully, so that others skilled in the art to which it appertains may apply the same. As both sides of each of the several forms of trucks illustrated are designed to be identical in construction, only one side of each form of truck will be described.

In the drawings, 1 is the truck side frame, 2 the bolster, and 3 the journal boxes. The side frames are provided with centrally located bolster openings which receive the usual bolster supporting springs 4, 4. As shown more particularly in Fig. 1 the bolster 2 is preferably supported by the springs 4, 4 through the intermediacy of a spring seat 5 which rests upon the upper ends of the bolster springs and is provided on its upper surface with a concave spherical socket into which a correspondingly curved convex projection 6 formed on the under side of the bolster fits. The seats 5 may be conveniently guided in their movements by means of guide ribs 7 formed integral with the side frames and extending upwardly a sufficient distance from the bases of the bolster openings formed therein.

Secured to the end of the bolster 2, as by means of bolts 8, and extending parallel with the side frame 1 is a bar 9 which is yieldingly connected to the side frame on opposite sides of the bolster opening. This yielding connection of the bar 9 with the adjacent side frame 1 is preferably such as will permit the said bar and bolster to have not only a vertical movement with respect to the side frame but also a horizontal movement with respect thereto. For this purpose it is preferred to form each side frame with vertically extending apertures that are located on opposite sides of the bolster opening and to form the ends of each of the bars 9 with parallel guide members 10 which extend inwardly into said apertures and receive between them followers 11 and 12 between which horizontally extending springs 13 are interposed.

As shown in Figs. 2 and 4 the horizontally arranged springs 13 may be retained in position between their respective followers by means of bolts 14 which also serve to prevent the followers 11 and 12 from becoming disassociated from the side frames. The followers 11 and 12 are capable of movement toward and from each other to compress the spring 13 which is located between them, the outward movement of the followers with respect to the side frame being, as shown in Fig. 2, limited by the engagement of the flanges of the followers with the side frame. To provide for the vertical movement of the bar 9 and attached bolster 2, a vertically extending spring 15 is situated on the base of each of the openings of the side frame into which the ends of the bar 9 extend, and the upper end of each of these springs is surmounted by a spring seat 16 that engages the under faces of the lower guide member 10, the engagement being such as will permit the said guide member to slide upon said spring seat in the direction of length of the bolster.

The journal boxes 3 are preferably connected to the side frames 1 by means of detachable journal box yokes 17 which may be secured to the side frames by means of keys 18. To secure a very high degree of flexibility of the truck, which will enable it to readily pass around curves, the journal boxes are preferably so mounted in the side frame as to be capable of moving horizontally with respect to said side frames in the direction of length of the truck axles and also to be capable of a limited pivotal motion with respect to the side frames about a vertical axis. For this purpose each end of the side frame and also each of the journal box yokes 17 is preferably formed with a box 19 within and upon which is seated horizontally arranged springs 20 that bear upon the opposite sides of a slidable pintle socket 21 into which a pintle 22 formed upon the adjacent side of the journal box 3 extends.

In Figs. 5 to 8 inclusive, is shown a construction in which the side frames are designed to have only a horizontal rotation with respect to the bolster, instead of being permitted to rotate both horizontally and vertically with respect thereto, as in the form of construction illustrated in Figs. 1 to 4 inclusive. In this modified form of construction the curved bearing member 6 with which each end of the bolster 2 is provided is omitted, and the bolster 23 is formed with flat lower faces which rest directly upon the upper ends of bolster supporting springs 24 that are seated upon a spring plank 25 which is provided at each end with members 26 having cylindrical hubs 27 that are journaled in the corresponding recesses in the side frames 28. While the cylindrical hubs 27 may be made sufficiently large to alone form the pivotal connection between the bolster and side frames, it is preferred to additionally employ for this purpose vertically extending bolts 29 which pass through the ends of the bolster 23 and the upper and lower rails of each of the side frames 28.

The bars 9 which are secured to each end of the bolster 23 by means of bolts 8 are shown as of identically the same form as the parts indicated by corresponding letters of reference and heretofore described. Each end of each of the bars 9 is provided with guide members 10, 10 which enter vertically extending recesses in the side frame on opposite sides of the bolster opening therein. The followers 11 and 12, springs 13 and bolts 14, which are associated with each end of each bar 9, are constructed, arranged, and operated in identically the same manner as the correspondingly numbered parts heretofore described with reference to Figs. 1 to 4 inclusive, of the drawings.

The journal boxes 3 which are illustrated in this form of construction are arranged to be capable of a horizontal movement with respect to the side frames, the said journal boxes being for this purpose provided with vertically extending pintles 22, the upper one of which on each journal box enters a corresponding cylindrical socket 30 formed in the end of the side frame and the lower of which enters a socket formed in the lower portion of the journal box yoke 31.

Figs. 9 to 11 inclusive, illustrate a further modification in which the journal boxes and side frames may move horizontally with respect to each other. In this form of construction each journal box 32 is provided with a plurality of rigidly attached followers 34 that are adapted to compress a horizontally extending journal box spring 35 which is normally seated upon spring seats 36 formed on the side frame, said spring seats being slotted as at 37 to permit the followers 34 to move inwardly and outwardly in a horizontal direction to thus compress the spring 35, as will be readily understood. The journal boxes 32 may, if desired, be connected to the side frames 33 by means of journal box yokes.

The modification shown in Fig. 12 of the drawings embodies the form of connection between the bolster and side frames shown in the principal figures of the drawings, while the form of connection of the journal boxes and side frames is identically the same as that illustrated in Figs 5, 6, 7 and 8. The several structural features of this form of truck are indicated by letters of reference showing their correspondence with the like features of construction heretofore described, and it is unnecessary, therefore, to describe this modified form of construction in detail.

In the construction shown in Figs. 13 and 14 the journal box 39 which is movable horizontally with respect to the truck side frame 40, is provided on each side with wheels or rollers 41 upon which the side frame 40 rests. These rollers, which serve to reduce the friction between the side frames and journal boxes when these parts move horizontally with respect to each other, are journaled on oppositely arranged horizontal pintles 42 which project outwardly from the sides of the journal box. When large rollers such as are shown in these figures of the drawings are employed each journal box is preferably yieldingly connected to its side frame by devices corresponding to those shown in Figs. 9, 10 and 11 of the drawings, the journal box being provided with a plurality of followers 43 corresponding in form and function to the followers 34 and the journal box yoke being provided with slotted spring seats 44 between which is interposed a spring 45 that is compressed when the journal box moves horizontally in either direction with respect to the side frame.

When a truck such as shown in Figs. 1 to 4 inclusive of the drawings passes around a curve in the track, the front or leading end of one of the side frames rotates inwardly, thus compressing its spring 13 and forcing outwardly the leading end of the side frame on the opposite side of the truck, the rear end of each side frame moving in the reverse direction. As the journal boxes are pivotally and horizontally movable with respect to the side frames, the wheels and axles of the truck are thus permitted to retain their normal positions to each other uninfluenced by the angles which the side frames assume when the truck is passing around the curve, the wheels being thus enabled to travel on a curved track with practically as little contact between their flanges and the rails as occurs when the truck is moving on straight track. When the truck leaves the curve the springs 13 force the side frames to their normal positions. It will be observed that in this construction the spherical bearings between the bolster 2 and the spring seats 5 permit the side frames to rotate vertically as well as horizontally, such a construction overcoming the possibility of derailment which is often occasioned when a truck passes around a curve which is elevated on one side, or passes over high or low joints. The springs 15 which permit the side frames to yieldingly rotate with respect to the bolster, serve to maintain the normal relation of the side frames and bolster.

The operation of the form of construction shown in Figs. 5 to 8 inclusive is substantially the same as that heretofore described, except that the side frames are not designed to rotate vertically with respect to the bolster.

In the constructions shown in Figs. 9, 10, 11, 13 and 14, when the front wheels of the truck strike a curve the side frames and wheels axles and journal boxes move horizontally with respect to each other, but in these constructions, instead of the side-frames rotating the journal boxes travel or move through the side-frames, inwardly through one side-frame and outwardly through the other, thereby reducing the friction of the wheel flanges upon the rails. This horizontal movement of the journal boxes with respect to the side-frames causes the followers 34 or 42, as the case may be, to compress the springs between them, so that when the truck passes on to straight track such springs expand and return the journal boxes to their normal positions.

Having thus described my invention, what I claim and desire to secure by Letters Patent is:

1. In a car truck, the combination with side frames, of journal boxes pivotally mounted on said side frames and movable horizontally with respect to said side frames.

2. In a car truck, the combination with side frames having detachable journal box yokes, of journal boxes secured to said side frames by said yokes, each of said journal boxes having a pivotal connection with its yoke and side frame.

3. In a car truck, the combination with side frames having detachable yokes for securing journal boxes thereto, of journal boxes movable horizontally with respect to said side-frames and yokes, and yielding means interposed between each journal box and its yoke for permitting said journal boxes to move horizontally with respect to said yokes and side-frames.

4. In a car truck, the combination with side frames, of a bolster pivotally connected to rotate horizontally with respect to said side frames.

5. In a car truck, the combination with side frames, of a bolster pivotally connected to said side frames so as to rotate horizontally with respect thereto, and springs interposed between said bolster and side frames and adapted to be compressed by the rotation of said side frames with respect to said bolster.

6. In a car truck, the combination with side frames, of a bolster pivotally connected thereto, and horizontally arranged springs interposed between said bolster and side-frames.

7. In a car truck, the combination with side-frames, of a bolster pivotally connected thereto, springs compressible by the horizontal rotation of the side-frames with respect to said bolster, and springs compressible by the vertical rotation of the side-frames with respect to said bolster.

8. In a car truck, the combination with side-frames, of a bolster, springs for supporting said bolster, spring-caps interposed between the bolster and the bolster supporting springs, said bolster and spring-caps having ball and socket connection, vertically extending springs interposed between each side-frame and the bolster and adapted to be compressed by a vertical rotation of the side-frame, and horizontally extending springs interposed between each side-frame and the bolster and adapted to be compressed by a horizontal rotation of the side-frame.

9. In a car truck, the combination with side-frames, of a bolster pivotally connected thereto, and journal boxes connected to said side-frames so as to be rotatable with respect thereto.

In testimony whereof I affix my signature, in the presence of two subscribing witnesses.

HARRY C. BUHOUP.

Witnesses:
D. B. MASON,
HARRY W. STANNARD.